INVENTORS.
Darriel L. Alsobrooks
Clifford C. Wrigley
BY
Their Attorney

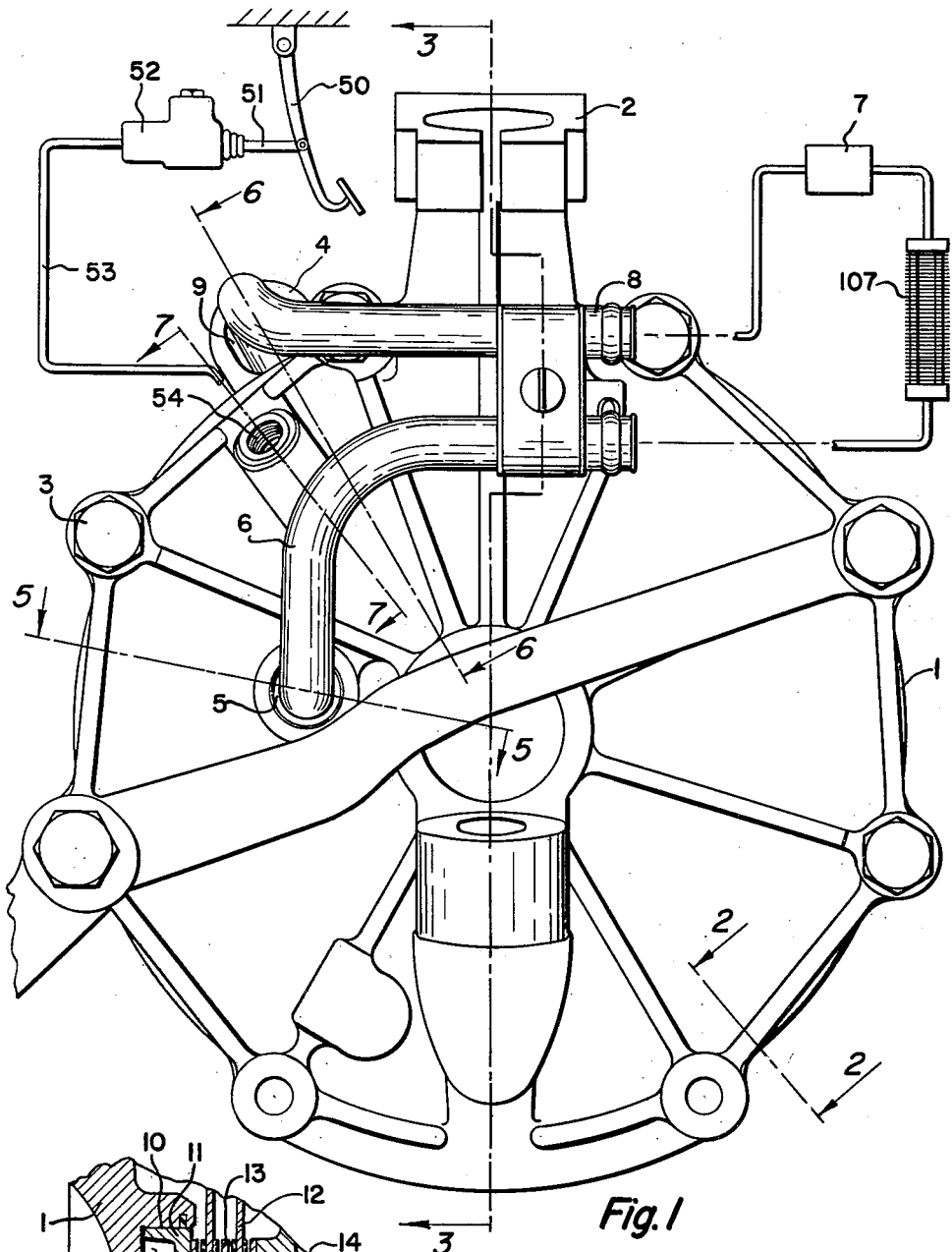
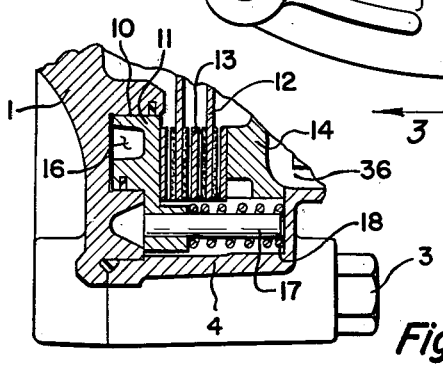
Fig. 1
Fig. 2
Oct. 30, 1962 — D. L. ALSOBROOKS ET AL — 3,061,048
BRAKE COOLING FLUID PUMP
Filed June 27, 1960 — 5 Sheets-Sheet 1
INVENTORS.
Darriel L. Alsobrooks
Clifford C. Wrigley
BY
Their Attorney Oct. 30, 1962  D. L. ALSOBROOKS ET AL  3,061,048
BRAKE COOLING FLUID PUMP Filed June 27, 1960  5 Sheets-Sheet 3

INVENTORS.
Darriel L. Alsobrooks
Clifford C. Wrigley
Their Attorney

Oct. 30, 1962  D. L. ALSOBROOKS ET AL  3,061,048
BRAKE COOLING FLUID PUMP
Filed June 27, 1960  5 Sheets-Sheet 5

INVENTORS.
Darriel L. Alsobrooks
Clifford C. Wrigley
BY
Their Attorney

United States Patent Office 3,061,048
Patented Oct. 30, 1962

3,061,048
BRAKE COOLING FLUID PUMP
Darriel L. Alsobrooks, Rochester, and Clifford C. Wrigley, Grosse Pointe Woods, Mich., assignors to General Motors Corporation, Detroit, Mich., a corporation of Delaware
Filed June 27, 1960, Ser. No. 39,091
10 Claims. (Cl. 188—18)

This invention relates to a vehicle disk brake and more particularly to a cooling fluid pump operating in combination with the vehicle disk brake.

The modern trend on the motor vehicle is toward a vehicle wheel of a smaller diameter. The decrease in the diameter of the wheel reduces the space available for a vehicle brake. Although the vehicle brakes are accordingly required to be more compact, the capacity of the brake is required to be greater than in the past. A vehicle disk brake readily adapts itself to this type of a situation in providing increased capacity for the braking means. Due to the compactness of the vehicle disk brake, however, a cooling fluid system is required to cool the brakes and a compact cooling fluid pump is also required if the pump is to be located within or adjacent to the braking structure.

A periphery pump adapts itself readily to this type of brake cooling system. The periphery pump may be located adjacent to the brake disks and provides adequate pumping for circulation of the cooling fluid through the braking means to increase the capacity of the vehicle brakes to the present requirements.

It is an object of this invention to provide a fluid cooled disk brake having a periphery pump for circulating the cooling fluid through the vehicle brake.

It is another object of this invention to provide a by-pass valve means operating in response to a predetermined pressure in the cooling fluid to divert a portion of the cooling fluid to the return side of the cooling fluid pump.

It is a further object of this invention to provide a periphery pump having a rotating element operating with the vehicle wheel for operation with the vehicle brakes.

It is a further object of this invention to provide a cooling fluid pump which is not a positive displacement pump but provides pressure readily available for circulation of the cooling fluid with automatic pressure control valve means to divert a portion of the fluid to the input side of the pump while the remainder circulates through a heat exchanger.

The objects of this invention are accomplished by employing a vehicle disk brake mounted in a common housing with the cooling fluid pump. The rotating brake disks and the rotating element of the periphery pump both are connected to the hub section of the vehicle wheel and rotate at all times when the vehicle wheel is in rotation. The housing of the pump forms a mounting for the stationary brake disks. A by-pass valve arrangement is mounted within the housing to permit return of the cooling fluid to the low side of the cooling fluid pump in response to the predetermined pressure. A heat exchanger is also employed in the cooling fluid circuit to provide a means for cooling of the cooling fluid when the vehicle is in operation.

In this manner a compact braking unit is formed in combination with the periphery cooling fluid pump to provide circulation of the cooling fluid when the vehicle wheel is rotating. The braking unit is of a compact nature wherein the unit may be installed in a confined area and yet provide adequate braking for the vehicle.

Further objects and advantages of the present invention will be apparent from the following description, reference being had to the accompanying drawings wherein preferred embodiments of the present invention are clearly shown.

In the drawings:

FIGURE 1 is an end view of the vehicle brake showing the various locations of the cross sections of later views.

FIGURE 2 is a fragmentary cross section taken on lines 2—2 of FIGURE 1.

Figure 3:
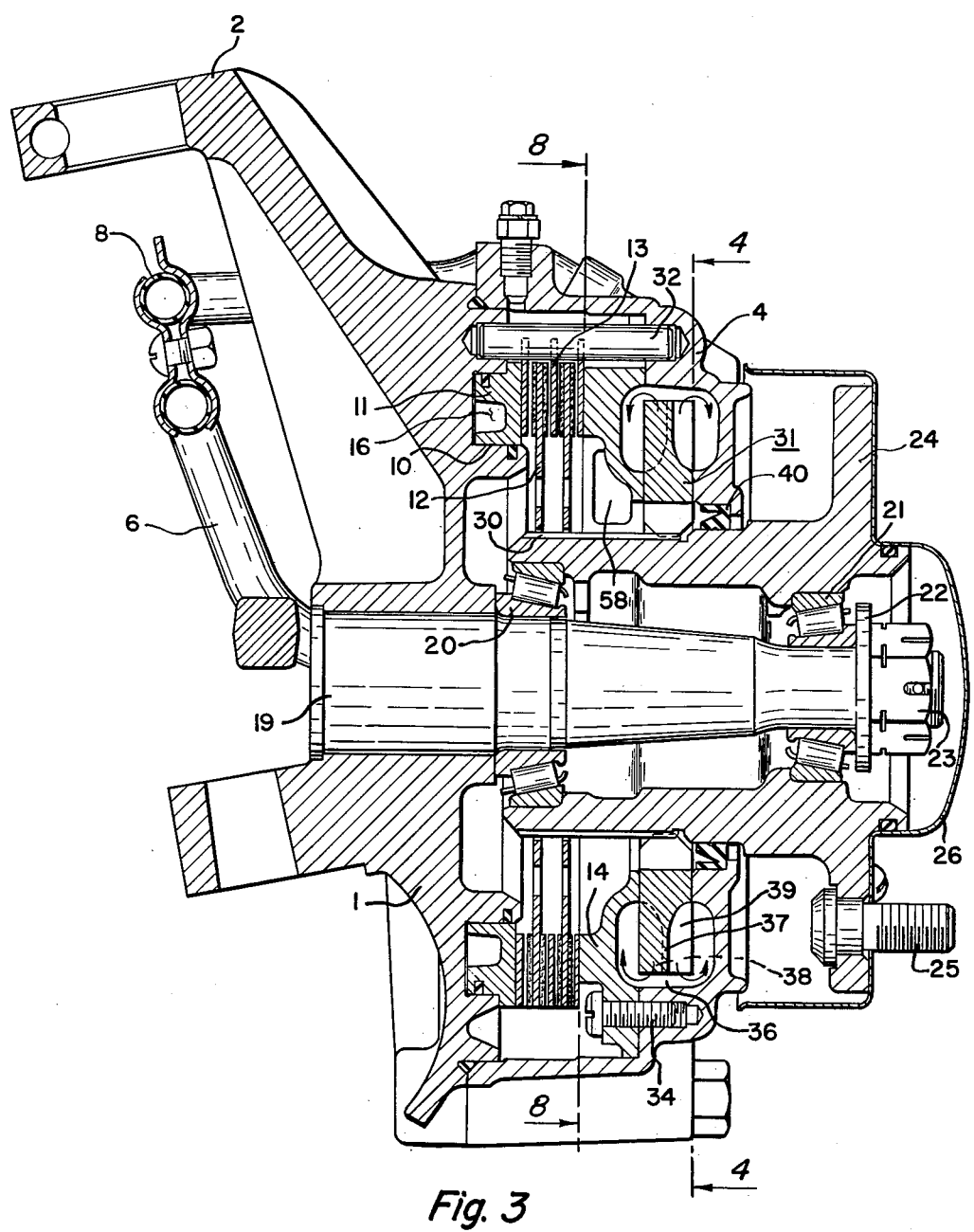
FIGURE 3 is a cross section view taken on line 3—3 of FIGURE 1.

FIGURE 1 shows the inboard side of the brake housing and a diagrammatic view of the external portion of the fluid systems. The end plate 1 is cast integral with the steering knuckle 2. A plurality of bolts 3 fasten the end plate to the brake housing 4. The end plate 1 forms an opening 5 for receiving the outlet conduit 6 leading from a braking structure. The outlet conduit 6 feeds into the reservoir 7 which includes an expansion chamber through the heat exchanger 107. The reservoir 7 is in communication with the inlet conduit 8 which feeds into an opening 9 in the brake housing 4.

FIGURE 2 is a cross section view taken on line 2—2 of FIGURE 1. FIGURE 2 shows the annular hydraulic cylinder 10 formed within the end plate 1. The annular hydraulic cylinder 10 receives the annular piston 11 for actuation of the vehicle brakes. The plurality of rotating disks 12 are mounted alternately between the stationary disks 13. The cover plate 14 forms the backing plate for the braking disks.

An actuating chamber 16 is formed in the cylinder for operating the vehicle brakes. The retraction means is provided through the plurality of pins 17 and springs 18 which return the annular hydraulic wheel piston 11 to its normally retracted position when the brakes are released.

Referring to FIGURE 3, the end plate 1 retains the spindle 19 which supports the wheel structure. The spindle 19 extends outboard and provides a mounting means for the inboard bearing assembly 20 and the outboard bearing assembly 21. A washer 22 and nut 23 fasten the bearing assemblies on the spindle 19. The hub 24 is mounted on the outer periphery of the bearing assemblies 21 and 20. The hub forms a mounting means for a wheel through the plurality of bolts 25. The cover 26 is fastened on the outboard side of the hub 24 and forms a seal for the fluid system at this point.

The hub section 24 has a spline portion 30 about its outer periphery on the inboard end. The spline portion 30 provides a means for mounting the plurality of rotating disks 12 and also the impeller 31. The plurality of rotating disks 12 and the impeller 31 have a mating spline portion to engage the spline portion 30 on the hub 24. The brake disks 12 engage the stationary brake disks 13 which are mounted within the inner periphery of housing 4. A plurality of pins 32 are received in slots formed in the outer periphery of the stationary brake disks 13. The pins 32 retain the stationary position of the brake disks relative to the brake housing. The annular hydraulic piston 11 is mounted within the grooved portion forming the hydraulic wheel cylinder 10 and is concentric with the plurality of brake disks 12 and 13. The outboard end of the annular piston 11 engages the inboard stationary brake disk when the vehicle brakes are actuated.

The cover plate 14 forms the backing plate on the outboard side of the brake disks. The cover plate 14 also forms a portion of the housing for the periphery pump. The impeller 31 is enclosed within the outboard end of the brake housing 4 and the cover plate 14. A plurality of screws 34 fasten the cover plate 14 to the inner portion of the brake housing 4. The inner periphery of the outboard end of the brake housing 4 and the cover plate 14 form a groove 36 for receiving the impeller 31. The cross section of the groove is generally square having rounded corners to accommodate the flow of fluid in the outer periphery of the groove.

The impeller 31 has radial slots 39 cut in its outer periphery leaving a central wall 37 separating the inboard slots 38 from the outboard slots 39. The adjacent portion of the slots forming the radial inner portion of the wall 37 also have rounded corners to accommodate circulatory flow of fluid in the groove 36.

A seal 40 is mounted within the inner periphery of housing 4 and the outer periphery of the hub 24 to provide a seal at this point of the fluid system.

Figures 4, 10:
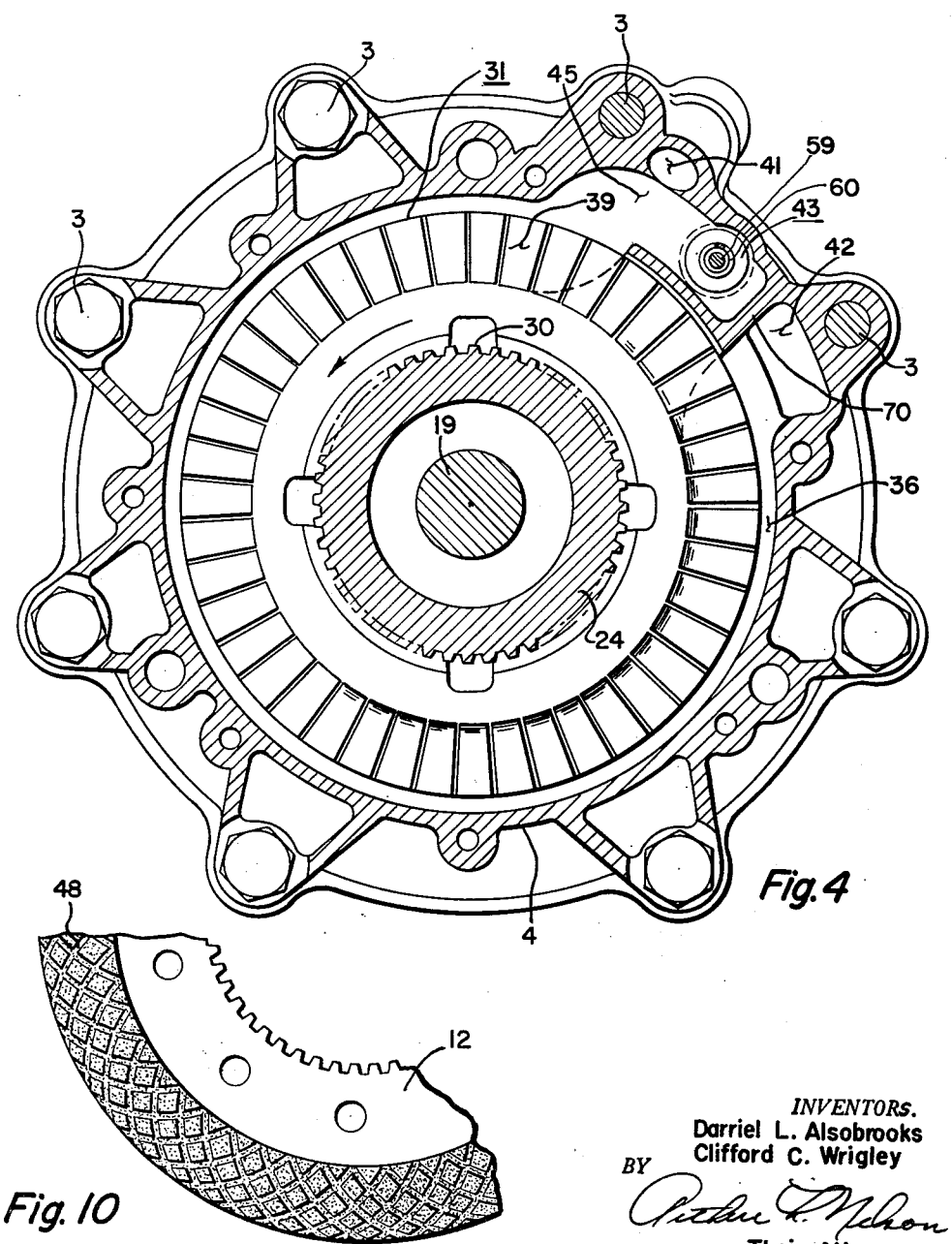
FIGURE 4 is a cross section view taken on line 4—4 of FIGURE 3.
FIGURE 10 is a cross section view taken on line 10—10 of FIGURE 5.

FIGURE 4 illustrates the radial slots 39 as viewed from the outboard side. The FIGURE 4 is taken on line 4—4 of FIGURE 3 and shows the clearance formed by the groove 36 and the outer periphery of the impeller 31. The inlet port 41 is in communication with the groove 36. The fluid enters the inlet port 41 and follows about the outer periphery of the impeller 31 through the groove 36 for almost 360° to the outlet port 42. The inlet port and the outlet port feed and exhaust respectively on axially opposite sides of the groove 36. This is more clearly shown in the subsequent views in this application. A by-pass valve assembly 43 is also in communication with the groove 36 on the inlet side adjacent the inlet port 41. The by-pass valve assembly permits return of fluid without flowing through the heat exchanger and the external fluid circuit.

Figure 6:
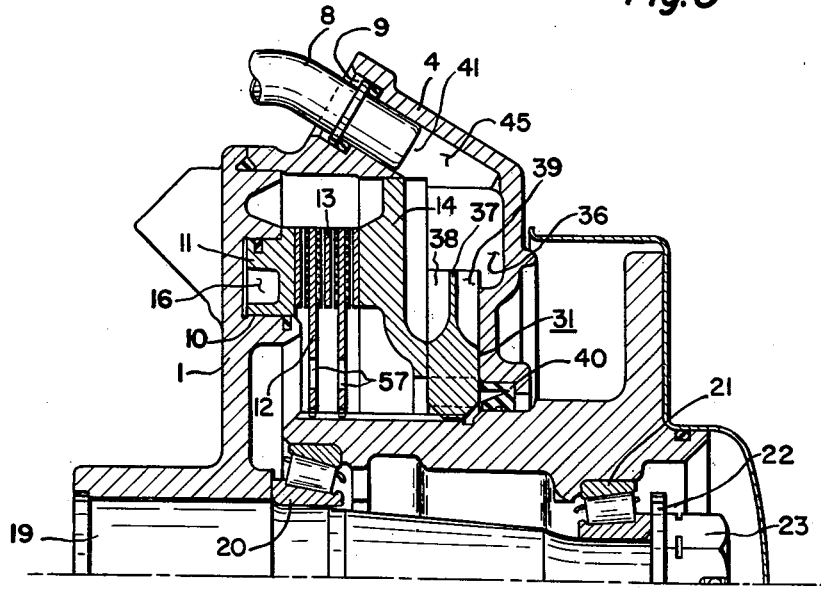
FIGURE 6 is a cross section view taken on line 6—6 of FIGURE 1 showing the inlet port to the cooling fluid pump.

FIGURE 6 illustrates the inlet conduit 8 feeding into the housing 4. The fluid feeds through the conduit 8 into the chamber 45 radially outward of the impeller 31. As the impeller 31 rotates, the fluid is carried about the peripheral groove 36. The peripheral groove is also shown about the outer periphery of the impeller 31 in FIGURE 4.

Figure 5:
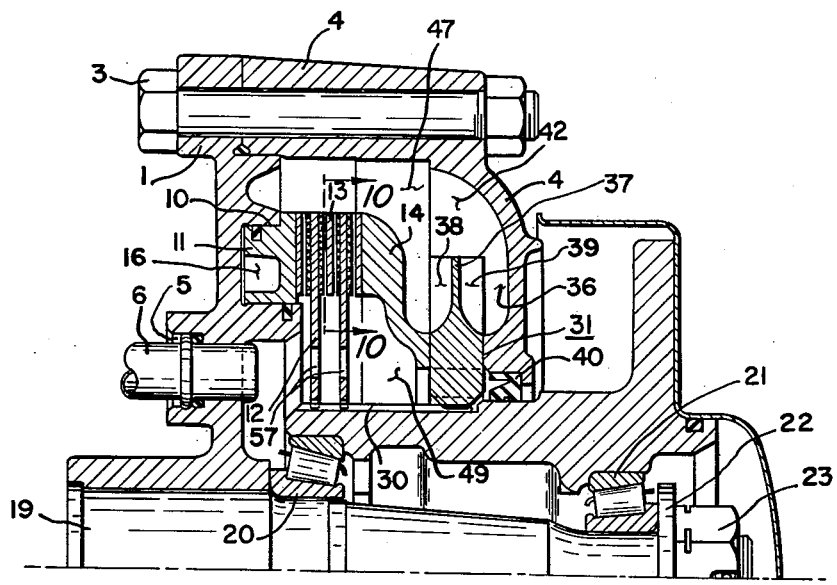
FIGURE 5 is a cross section view taken on line 5—5 of FIGURE 1.

As the fluid flows through the peripheral groove 36 it enters the outlet chamber 42 as shown in FIGURE 5. The outlet chamber 42 is in communication with the passage 47 about the outer periphery of the brake disks. As shown in FIGURE 10, the friction material of the brake disks 78 is formed with grooves 48 extending from the outer periphery to the inner periphery to accommodate the flow of fluid to the inner periphery of the brake disks. The fluid flows radially inward to the chamber 49 on the inner periphery of the brake disks. The fluid then passes through the outlet conduit 6. The fluid in conduit 6 passes through the external circuit as illustrated in FIGURE 1.

The fluid, however, does not necessarily have to flow through the external circuit and the heat exchanger. When the fluid in the chamber 49 reaches a predetermined pressure, the return by-pass valve assembly 43 permits the return of fluid directly to the input side of the periphery pump.

Figure 7:
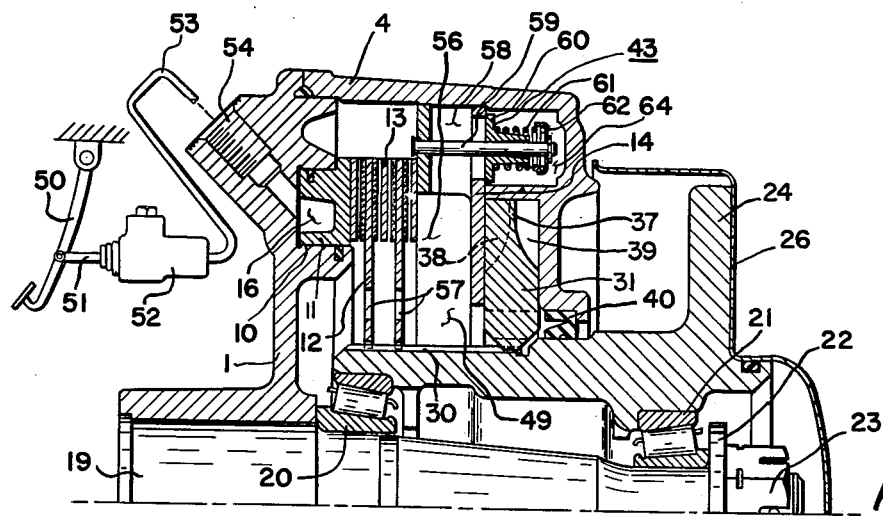
FIGURE 7 is a cross section view taken on line 7—7 of FIGURE 1 showing the by-pass valve and its relationship to the brake and pumping structure.

FIGURE 7 is a cross section view of the valve assembly 43. FIGURE 7 also discloses the actuating system for the vehicle disk brake.

The fluid actuating means for the vehicle disk brake includes the pedal 50 operating through a push rod 51 to pressurize fluid within the master cylinder 52. The master cylinder 52 is connected by a conduit 53 to the port 54 for pressurizing fluid within the actuating chamber 16.

It is noted that the chamber 49 extends about the inner periphery of the wheel cylinder to the inboard side of the brake disks. The plurality of openings 57 in the brake disks 12 permit the flow of fluid in either direction within the chamber 49. The cover plate 14 forms a radial groove 56 to accommodate the flow of cooling fluid radially outward to the valve chamber 58. The valve chamber 58 contains the stem 59 and the valve 60. The valve 60 seats on the cover plate 14 through the biasing effect of the spring 61 acting against the spring retainer 62 on the outboard end of the pin 59. When a predetermined pressure exists in the valve chamber 58, the valve element 60 is biased in spaced relation to the cover plate 14 thereby permitting the flow of fluid from the chamber 58 to the chamber 64.

Figure 8:
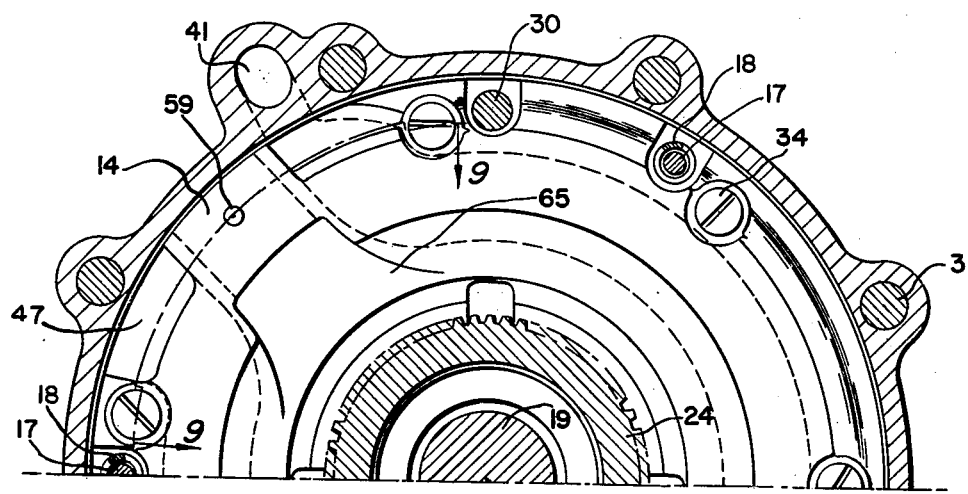
FIGURE 8 is a cross section view taken on line 8—8 of FIGURE 3.

Referring to FIGURE 8, the radial groove 56 is contained within the raised portion 65 of the cover plate 14.

Figure 9:
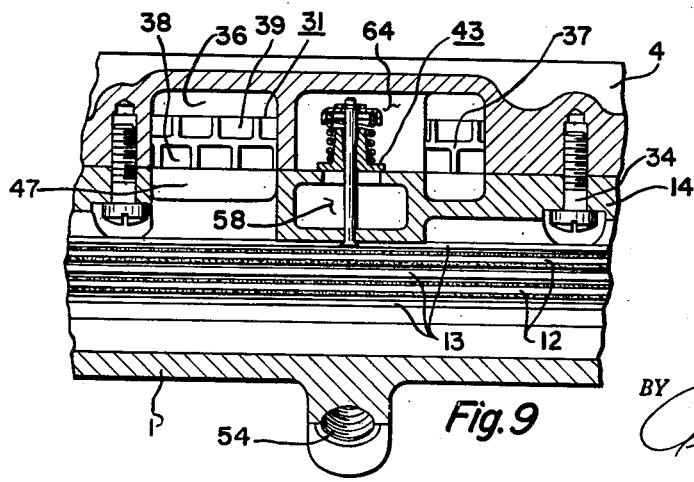
FIGURE 9 is a cross section view taken on line 9—9 of FIGURE 8 and shows the passage means in communication with the pump and the by-pass valve.

FIGURE 9 illustrates the connections between the passages returning fluid to the input side of the periphery pump. The plurality of screws 34 fasten the cover plate 14 to the brake housing 4. The valve assembly 43 is shown within the chamber 64. The return fluid flows radially outward through the return chamber 58 and then enters the chamber 64 through the valve assembly 43. The fluid in the chamber 64 is permitted to flow about the outer periphery of the impeller 37 and is then circulated through the peripheral groove 36. As the fluid flows about the peripheral groove 36, it enters the exhaust chamber 42 which is nearly 360° around the peripheral groove 36. The fluid in chamber 42 is pressurized due to the rotating of the impeller 37 which provides a pressurized fluid in this chamber at all times when the vehicle wheel is in rotation.

The vehicle disk brake operates in the following described manner. As the pedal 50 is depressed fluid is pressurized within the master cylinder 52. This, in turn, pressurizes fluid within the conduit 53 and the pressurizing fluid in chamber 16 in the hydraulic cylinder. Pressurization of fluid within the chamber 16 moves the piston 11 axially outboard compressing the disks and thereby actuating the vehicle brakes.

The cooling system operates when the vehicle wheels are in motion. The hub 24 rotates when the wheel is rotating thereby rotating the impeller 31 and the plurality of rotating disks 12. When the vehicle brakes are retracted, the brake disks are axially in spaced relation to each other thereby permitting the fluid to flow between the brake disks to the inner periphery of the disk stack. The fluid then is permitted to flow through the external conduit 6, the heat exchanger 107 and reservoir 7 and return conduit means 8. The fluid, however, is also permitted to return to the by-pass valve 43 without passing through the heat exchanger.

The cooling fluid enters through conduit 8 and the inlet chamber 45 to the outer periphery of the impeller 31. As the impeller rotates the fluid within the peripheral groove 36, it provides a tangential flow of the fluid within the groove. A circulatory flow is also present within the groove 36. As the impeller 31 rotates within the peripheral groove, the fluid is projected outward from the outer periphery of the impeller. The fluid is forced to rotate in a manner as shown by the arrows in FIGURE 3. The The circulatory motion is in the opposing direction as the fluid contacts the outer periphery of the peripheral groove 36. The fluid then re-enters the impeller on the radial inner portion of the grooves. The combination of the tangential and circulatory flow provides helical movement of the fluid whereby the helix would have an annular center line as the fluid flows through the peripheral groove 36.

The circulatory action of the fluid as the impeller rotates within the peripheral groove provides a momentum exchange of the fluid as it moves circumferentially or tangentially within the peripheral groove. This momentum exchange of the fluid passing through the peripheral groove creates an increase in pressure as the fluid passes tangentially through the groove. The fluid increases in pressure as it moves within the peripheral groove thereby providing a pressurized fluid at the output side of the peripheral groove in the chamber 42. The fluid within the chamber 42 then passes through the peripheral passage 47 about the outer periphery of the disk stack. If the vehicle brakes are actuated, the fluid then must flow through the radial grooves 48 in the friction material of the brake disks. In this manner, the brake disks are cooled as the fluid flows between them to the inner periphery of the disks to chamber 49. In event the pressure buildup in the chamber 49 is not too great, the check valve assembly 43 will remain closed and the fluid will pass through the external circuit through conduit 6. The fluid then passes through the heat exchanger 107 and reservoir 7 to the return conduit 8 to the input side of the cooling fluid pump.

In event a pressure buildup is present within the chamber 49, the fluid then may return through the by-pass valve assembly 43. The fluid returning through the by-pass assembly 43 leaves the chamber 49 and passes radially outwardly through the passage 56. The fluid passes radially outward from passage 56 through chamber 58 and unseats the valve elements 60 from the cover plate 14. This in turn permits the fluid to pass through the valve into the chamber 64 and return to the input side of the cooling pump. The fluid again rotates about the outer periphery in the peripheral groove 36 until it reaches the stripper 70 in the peripheral passage. The stripper 70 forces the fluid to exhaust into the chamber 42. The portion of the fluid retained within the slots 38 and 39 of the impeller 31 is permitted to rotate underneath the stripper and is carried to the input side of the cooling fluid pump. This fluid continues to rotate with the fluid entering the input chamber 45.

The peripheral pump as illustrated does not require a positive displacement of the fluid. The peripheral pump does, however, maintain a pressure at the output side of the periphery pump. This pressure is constantly available for circulation of the cooling fluid through the cooling fluid system. The peripheral pump fits the limited space available adjacent to the disk brake. This compact design is an advantageous feature of this type of pump in combination with the fluid cooled brake. It is also pointed out that the simplicity of the pump design adapts itself readily to this type of structure wherein only a single moving element is required to provide a pumping of the cooling fluid through the vehicle braking means.

While the embodiments of the present invention as herein disclosed, constitute preferred forms, it is to be understood that other forms might be adopted.

What is claimed is as follows:

1. A fluid cooled vehicle disk brake having cooling fluid inlet and outlet ports and comprising in combination, a stationary member, a single shaft means supported by said stationary member, at least one stationary brake disk connected to said stationary member mounted concentrically around said single shaft means, a rotating member rotatably mounted on said single shaft means, at least one rotating brake disk connected to said rotating member for frictional engagement of said stationary disk when said vehicle brake is actuated, means for actuating said vehicle brake, a cooling fluid system including external conduit means having a heat exchanger in communication with the inlet and outlet ports in said vehicle brake, a cooling fluid pump having an inlet side and an outlet side and a single rotating element connected to said rotating member, housing means enclosing said brake disks and said cooling fluid pump, passage means connecting the inlet port in said vehicle brake to the inlet side of said cooling fluid pump, means for conveying cooling fluid through said brake disks when said vehicle brakes are actuated, passage means connecting the outlet side of said fluid cooling pump with said means for conveying fluid through said brake disks, passage means connecting the opposite end of said means for conveying fluid through said brake disks to the outlet port in communication with the external conduit means, said single element of said cooling fluid pump having radial vanes, said housing means having an annular groove formed on the inner periphery thereof for reception of the outer periphery of said single rotating element with the radial inner portion of said annular groove on the same radial circle as the radial inner portion of a stripper means in said annular groove between the inlet and outlet sides of said pump, said vanes and said single rotating element forming a single radial wall separating the two sides of said annular groove to provide a dual oval shaped cross section of said annular groove for circulatory movement of cooling fluid when said cooling fluid pump is in operation.

2. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating disk connected to said rotating member for frictionally engaging said stationary brake disk when said vehicle brake is actuated, means for actuating said vehicle brake, a cooling fluid system including external conduit means having a heat exchanger, a cooling fluid pump having an inlet side and an outlet side and a single rotating element connected to said rotating member for rotation with said rotating member and said rotating brake disk, a housing means enclosing said brake disks and said cooling fluid pump, inlet passage means connecting said external conduit means to the input side of said cooling fluid pump, groove passage means in said brake disks for conveyance of fluid between the alternate brake disks when said vehicle brake is actuated, passage means connecting the outlet side of said cooling fluid pump to said groove passage means, passage means connecting said groove passage means to the outlet side of said external conduit means thereby providing a closed fluid system, said single rotating element of said cooling fluid pump having arcuate slots cut along the lateral surface on the outer periphery of said element, said slots being formed with a central wall extending radially through said element, said housing means having an annular groove formed on the inner periphery thereof receiving said single element and stripper means in said annular groove between the input and output sides of said pump, said annular groove forming a double oval cross section with said slots in said single element to provide means for circulatory flow of cooling fluid within said two oval shaped cross sections as said fluid is carried tangentially through said annular groove when said cooling fluid pump is in operation.

3. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating brake disk connected to said rotating member for frictionally engaging said stationary brake disk when the vehicle brake is actuated, means for actuating said vehicle brake, a cooling fluid system including external conduit means, a cooling fluid pump adjacent to said brake disks connected to said rotating member and having a single rotating element and an inlet side and an outlet side, housing means enclosing said brake disks and said cooling fluid pump, inlet passage means connecting said external conduit means to the inlet side of said cooling fluid pump, passage means connecting the outlet side of said cooling fluid pump for circulation of cooling fluid through said brake disks in communication with said external conduit means, said single element of said cooling fluid pump having arcuate slots cut on the lateral faces in the outer periphery of said single element, said single element formed with a central wall between the arcuate slots formed on the opposite lateral faces of said element, said housing means having a peripheral groove formed therein receiving said single element and stripper means in said peripheral groove between said inlet side and said outlet side of said pump, said peripheral groove forming double oval cross sections with said arcuate slots for circular motion of cooling fluid as said cooling fluid flows tangentially through said peripheral slot when said cooling fluid pump is in operation.

4. A fluid cooled vehicle disk brake having cooling fluid inlet and outlet ports and comprising in combination; a stationary member, a single shaft means supported by said stationary member, at least one stationary brake disk connected to said stationary member, a rotating member rotatably mounted on said shaft means, at least one rotating brake disk connected to said rotating member for frictionally engaging said stationary brake disk when said vehicle brake is actuated, means for actuating said vehicle brake; a cooling fluid system including, external conduit means, a cooling fluid pump having an inlet side and an outlet side and a single rotating element connected to said rotating member, housing means enclosing said brake disks and said cooling fluid pump, passage means connecting said external conduit means to the inlet side of said cooling fluid pump, passage means connecting the outlet side of said cooling fluid pump for conveyance of fluid through said brake disks to said external conduit means thereby providing a closed continuous cooling fluid system for circulating of cooling fluid, said single element of said cooling fluid pump having curvilinear surfaces of slots forming a central wall in said single element, said curvilinear surfaces curving laterally toward the radially inner portion of said slot, said housing means having a peripheral groove formed therein having a curvilinear cross section to form dual oval cross sections with said curvilinear slots in said single element to accommodate circulatory motion of cooling fluid in said oval shaped sections of said cooling fluid pump and stripper means extending into said peripheral groove between said inlet side and said outlet side of said pump, said curvilinear slots having radial walls formed between adjacent slots on the lateral portion of said elements, said radial walls projecting fluid radially outward of said walls when said cooling fluid pump is operated, the cooling fluid pump forming a generally helical movement of fluid with said helixes having an annular center as said fluid is rotated within said peripheral groove as said cooling fluid pump is operated.

5. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating brake disk connected to said rotating member for frictionally engaging said stationary brake disk when said vehicle brake is actuated, means for actuating said vehicle brake, cooling fluid system including, external conduit means, a cooling fluid pump having an inlet side and an outlet side and a single rotating element connected to said rotating member, housing means enclosing said brake disks and said cooling fluid pump, inlet passage means connecting said external conduit means to the inlet side of said cooling fluid pump, passage means connecting said outlet side of said cooling fluid pump to said external means through said vehicle brake disks, said housing means having a peripheral groove formed therein for reception of the outer periphery of said single element and stripper means extending into said periphery groove causing fluid to exhaust from said outlet side of said pump, said single element having radial vanes formed on the lateral surface by cutting slots on the lateral side of said single element, said peripheral groove having a cross section forming with said slots in said single element to form dual oval shaped cross sections for circulatory motion of a cooling fluid when said pump is in operation, said single element having a rotating motion in response to rotation of said rotating member thereby creating a tangential movement as well as circulatory movement of fluid as said single element is rotated to provide circulation of the cooling fluid.

6. A fluid cooled vehicle disk brake having cooling fluid inlet and outlet ports and comprising in combination; a stationary member, a single shaft means supported by said stationary member, at least one stationary brake disk connected to said stationary member, a rotating member rotatably mounted on said single shaft means, at least one rotating brake disk connected to said rotating member for frictionally engaging stationary brake disk when said vehicle brake is actuated, means for actuating said vehicle brake; a cooling fluid system including, external conduit means having an inlet side an an outlet side, cooling fluid pump, a housing means enclosing said brake disk and said cooling fluid pump, inlet passage means in said brakes connecting said external conduit means to the inlet side of said cooling fluid pump, outlet passage means connecting the outlet side of said cooling fluid pump for conveying cooling fluid through said vehicle brake disk to the external conduit means thereby providing a circulating system for cooling fluid, a single rotor element in said pump, said housing means forming a peripheral groove passage about the outer periphery of said single element of said cooling fluid pump with a restriction in said peripheral passage adjacent the outlet side of the peripheral pump, said single element received within said peripheral passage and having radial vanes and radial slots formed on the lateral surface of said single element, said slots and said housing forming dual oval shaped cross sections for accommodating a circulatory motion in combination with the tangential motion through said peripheral passage when said vehicle cooling fluid pump is in operation.

7. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating brake disk connected to said rotating member for frictionally engaging said stationary brake disk when said vehicle brake is actuated, means for actuating said vehicle brake; a cooling fluid system including external conduit means, a cooling fluid pump having an inlet side and an outlet side and a single rotating element connected to said rotating member, inlet passage means connecting said external conduit means to the inlet side of said cooling fluid pump, outlet passage means connecting the outlet side of said cooling fluid pump for circulation of cooling fluid through said brake disks in communication with said external conduit means, a housing means enclosing said single element of said cooling fluid pump and said brake disks, said housing means having a peripheral groove formed therein about the outer periphery of said single rotating element and a fluid restrictor means in said groove adjacent the outlet side of said pump, lateral slots formed on the lateral surfaces of said rotating element, a by-pass circuit in communication with said outlet passage means and the inlet passage means of said cooling fluid pump, a by-pass valve spring biased to a closed position for opening in response to a predetermined pressure in said outlet passage means to by-pass fluid to the inlet side of the cooling fluid pump and divert a portion of the cooling fluid from said external conduit means to said by-pass passage when a predetermined pressure exists in said outlet passage means.

8. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating brake disk connected to said rotating member for frictionally engaging said stationary brake disks when said vehicle brake is actuated, means for actuating said vehicle brake, a cooling fluid system including external conduit means, a cooling fluid pump having an inlet side and an outlet side, a housing means enclosing the brake disks and said cooling fluid pump, a single rotating element in said cooling fluid pump connected to said rotating member, inlet passage means connecting said external conduit means to the inlet side of said cooling fluid pump, groove means on said brake disks for conveying fluid through said brake disks when said vehicle brake is actuated, passage means connecting the outlet side of said cooling fluid pump to said groove means in said brake disks, outlet passage means connecting said groove means to the external cooling fluid circuit, a by-pass circuit including passage means connected to said outlet passage means and the inlet passage means of said cooling fluid pump, a by-pass valve in said by-pass circuit for diverting a portion of cooling fluid through said by-pass circuit when a predetermined pressure exists in said outlet passage means thereby controlling the amount of cooling fluid circulating through said external conduit means in response to a predetermined pressure within said outlet passage means of said vehicle brake.

9. A fluid cooled vehicle disk brake having cooling fluid inlet and outlet ports and comprising in combination, a stationary member, a single shaft means supported by said stationary member, at least one stationary brake disk connected to said stationary member, a rotating member rotatably mounted on said single shaft means, at least one rotating brake disk connected to said rotating member for frictionally engaging said stationary brake disks when said vehicle brake is actuated, means for actuating said vehicle brake, a cooling fluid system including external conduit means, a housing means enclosing said brake disks and having a peripheral groove formed therein from the inlet side to the outlet side of said pump, a cooling fluid pump having an inlet side and outlet side and a single rotating element for reception in said peripheral groove, inlet passage means connecting said external conduit means to the inlet side of said cooling fluid pump, grooved means formed on said brake disks for accommodating flow of cooling fluid between said brake disks when said vehicle brake is actuated, passage means connecting the outlet side of said cooling fluid pump to said grooved means, outlet passage means connecting said grooved means to the external conduit means, thereby providing a closed circulating system for cooling fluid, a by-pass circuit in communication with said outlet passage means and said inlet passage means, a by-pass valve in said by-pass circuit operating in response to a predetermined pressure in said outlet passage means thereby diverting a portion of the cooling fluid through said by-pass circuit when a predetermined pressure exists in said outlet passage means, said cooling fluid pump having lateral grooves within the peripheral grooved portion of said housing to provide tangential movement of the cooling fluid as well as the circulatory motion of the cooling fluid when said cooling fluid pump is in operation.

10. A fluid cooled braking unit comprising in combination, a vehicle brake, fluid actuating means for actuating said vehicle brake, cooling fluid passage means in said vehicle brake for cooling of said vehicle brake, a cooling fluid pump including, a single shaft means, a single rotating pump element rotatably mounted on said single shaft means, a housing means enclosing said single rotating element, inlet passage means and outlet passage means in said cooling fluid pump communicating with said cooling fluid passage means in said vehicle brake, said housing means having a peripheral groove formed therein about the outer periphery of said rotating element, a plurality of radial slots formed on the outer periphery of said rotating element, said housing means having a stripper means mounted in and restricting a portion of said peripheral groove and limiting continuous rotation of cooling fluid to the portion of fluid contained within said radial slots when said cooling element is in rotation.

References Cited in the file of this patent

UNITED STATES PATENTS

| | | |
|---|---|---|
| 2,788,870 | Heck | Apr. 16, 1957 |
| 2,828,840 | Kelley et al. | Apr. 1, 1958 |

FOREIGN PATENTS

| | | |
|---|---|---|
| 274,144 | Great Britain | July 20, 1927 |